(12) United States Patent
Chifarelli (10) Patent No.: US 11,322,915 B1
(45) Date of Patent: May 3, 2022

(54) METHODS AND ASSEMBLIES TO STABILIZE AND REDUCE AN ELECTRIC FIELD IN AN ENVIRONMENT

(71) Applicant: Armando Chifarelli, Asunción (PY)

(72) Inventor: Armando Chifarelli, Asunción (PY)

( * ) Notice: Subject to any disclaimer, the term of this patent is extended or adjusted under 35 U.S.C. 154(b) by 0 days.

(21) Appl. No.: 17/154,418

(22) Filed: Jan. 21, 2021

(51) Int. Cl.
*H01T 23/00* (2006.01)

(52) U.S. Cl.
CPC .................................. *H01T 23/00* (2013.01)

(58) Field of Classification Search
CPC ...................................................... H01T 23/00
USPC .......................................................... 361/231
See application file for complete search history.

(56) References Cited

U.S. PATENT DOCUMENTS

| | | | | |
|---|---|---|---|---|
| 4,839,581 A | * | 6/1989 | Peterson, Jr. .......... | G01R 29/24 324/450 |
| 5,153,811 A | * | 10/1992 | Rodrigo ................... | H01T 23/00 361/220 |
| 8,463,375 B2 | * | 6/2013 | Stevenson ................ | H01G 4/35 607/2 |
| 2010/0158582 A1 | * | 6/2010 | Adachi .............. | G03G 15/0258 399/296 |
| 2014/0198422 A1 | * | 7/2014 | Jones ..................... | H01G 4/005 361/91.1 |

\* cited by examiner

*Primary Examiner* — Dharti H Patel
(74) *Attorney, Agent, or Firm* — Dinsmore & Shohl LLP (57) ABSTRACT

Methods and assemblies to stabilize and reduce an electric field in an environment are provided that include an elongated member and a head member. The head member is coupled to the elongated member. The head member includes a floating electrode, a ground electrode, and an insulator portion. The ground electrode spaced apart from the floating electrode. The ground electrode is in communication with the elongated member to receive a charge with a polarity of a earth system. The insulator portion is positioned between the floating and ground electrodes to insulate the floating electrode from the ground electrode. The floating electrode induces an electrical charge from the environment surrounding the head member. The floating electrode balances an existing charge on the ground electrode using an electromagnetic induction to collect a plurality of charges in the environment such that the floating and ground electrodes generate a balanced electric field.

20 Claims, 4 Drawing Sheets

METHODS AND ASSEMBLIES TO STABILIZE AND REDUCE AN ELECTRIC FIELD IN AN ENVIRONMENT

TECHNICAL FIELD

The present disclosure relates to an assembly for maintaining an electric field, and more specifically, to an assembly that stabilizes an electric field in an open and/or closed environment surrounding the assembly.

BACKGROUND ART

In everyday lives, people are subjected to electric fields. For example, people are subjected to electric fields generated from certain devices at their home, at their workplace, or in other environments. Some devices may offer an electromagnetic protection due to the electric fields of the environment, such as equipment including screens that may be placed on mobile phones or an electrostatic shielding paint that may be used to internally protect electromagnetic radiation from transferring. A need exists for alternative systems and methods to efficiently reduce and mitigate emission of electromagnetic radiation.

SUMMARY

One aspect of the present disclosure relates to an assembly to passively stabilize an electric field in an environment to reduce and mitigate emission of electromagnetic radiation from excess charges in the environment using a balanced electric field. The assembly includes an elongated member and a head member. The head member is coupled to the elongated member. The head member includes a floating electrode, a ground electrode, and an insulator portion. The ground electrode is spaced apart from the floating electrode and in communication with the elongated member and configured to be charged with a polarity of an earth system. The insulator portion is positioned between the floating electrode and the ground electrode and configured to electrically insulate the floating electrode from the ground electrode. When the ground electrode is charged with an existing charge of the polarity of the earth system, the floating electrode through an electromagnetic induction induces an electrical charge of an opposite polarity from the environment surrounding the head member. Electrical charge of the opposite polarity flows to balance the existing charge on the ground electrode using the electromagnetic induction such that the floating and ground electrodes generate the balanced electric field.

Another aspect of the present disclosure relates to an assembly to reduce a plurality of excess charges from an environment surrounding the assembly to stabilize an electric field in the environment to reduce and mitigate emission of electromagnetic radiation in the environment using a balanced electric field. The assembly includes an elongated member and a head member. The elongated member is in communication with a ground surface. The head member is coupled to the elongated member. The head member includes a floating electrode, a ground electrode, and an insulator portion. The ground electrode is spaced apart from the floating electrode and in communication with the elongated member and configured to be a ground of the head member. The insulator portion is positioned between the floating and ground electrodes and configured to electrically insulate the floating electrode from the ground electrode. When the ground electrode is charged with an existing charge of the polarity of the ground surface, the floating electrode through an electromagnetic induction induces an electrical charge from the environment surrounding the head member of an opposite polarity. The electrical charge of the opposite polarity flows to balance the existing charge on the ground electrode using the electromagnetic induction such that the floating and ground electrodes generate the balanced electric field.

Yet another aspect of the present disclosure relates to a method for forming an assembly to stabilize an electric field in an environment to reduce and mitigate emission of electromagnetic radiation from excess charges in the environment using a balanced electric field. The method includes forming a floating electrode, forming a ground electrode configured to be charged with a polarity of a earth system, positioning an insulator portion between the floating electrode and the ground electrode to form a head member such that the ground electrode is spaced apart from the floating electrode, the insulator portion is configured to electrically insulate the floating electrode from the ground electrode, and forming a receiving portion into a ground electrode outer surface of the ground electrode. The method continues by forming an elongated member having a distal end and a proximate end, inserting the distal end of the elongated member into the receiving portion of the ground electrode such that the ground electrode is in communication with the elongated member, coupling the elongated member to the receiving portion of the ground electrode, and communicating the proximate end of the elongated with a ground surface. The method further includes charging the ground electrode with an existing charge of the polarity of the earth system, inducing via the floating electrode and through an electromagnetic induction an electrical charge of an opposite polarity from the environment surrounding the head member, balancing via a flow of the electrical charge of the opposite polarity the existing charge on the ground electrode using the electromagnetic induction, and generating via the flow and the floating and ground electrodes the balanced electric field.

These and additional objects and advantages provided by the embodiments described herein will be more fully understood in view of the following detailed description, in conjunction with the drawings.

BRIEF DESCRIPTION OF DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DESCRIPTION OF EMBODIMENTS

The present disclosure generally relates to an assembly such as electric field neutralizer assembly that stabilizes or otherwise sufficiently and passively neutralizes an electric field in an environment that surrounds the assembly. The assembly is configured to reduce and mitigate emission of electromagnetic radiation from excess charges in the environment using a balanced electric field. The balanced electric field generated by the assembly passively reduces the electric field and magnetic field of the surrounding environment as described herein. The assembly may include an elongated member and a head member. The elongated member may extend in a vertical direction to position the head member in a position above the ground level at a predetermined height. Further, the elongated member may connect the head member to the ground surface. The head member, coupled to the elongated member, may include a floating electrode, a ground electrode, and an insulator portion disposed therebetween.

The assembly is configured to reduce direct and/or indirect effects on other items, such as to protect humans, animals, and/or infrastructure, as produced by electrical and electromagnetic phenomena in a closed and/or open environment, and as described in greater detail below. By stabilizing the electrical field in the environment as described herein, the assembly is configured to act as a passive system in the environment to provide a level of protection based on mitigated electrical activity in the environment.

By way of example, and not as a limitation, the system may maintain an environment with a reduced electric field that is less than 5 V/m and effectively reduce the magnetic field to less than 100 nT. In contrast, without use of the system, an average value of a magnetic field in a home environment may be between 0.025-0.11 µT, in an office environment may be 0.18 µT, and in an electricity-related occupation environment may be higher. For example, for an electrical engineering or electrician occupation environment, the average value of the magnetic field may be between 0.4-0.6 µT. For a power line transmission environment, the average value of the magnetic field may be approximately 0.1 µT, and may be higher in higher exposure environments, such as at above 3 µT or even approximately 10 µT. Further, in an electrical power supply industry, and without use of the system as described herein to provide mitigating and protective effects, workers may be exposed to electrical fields of up to 30 kV/m. Average values of electrical fields at home, without use of the system as described herein, may be in the order of several tens of volts per meter In embodiments of the system described herein, when the ground electrode is charged with an existing charge of the polarity of the positive earth system, the floating electrode, through an electromagnetic induction, induces an electrical charge from the environment surrounding the head member of a negative opposite polarity. As such, an excess of electrons of the electrical charge of the negative opposite polarity in the floating electrode flow to the ground electrode. Such a flow of excess electrons act to balance the existing charge on the ground electrode using the electromagnetic induction. The electromagnetic induction acts to collect charges from an excess of a plurality of charges in the environment for the electrical charge of the floating electrode to generate the excess electrons in the floating electrode for the flow to the ground electrode. Based on the flow and the electromagnetic induction, the floating and ground electrodes generate the balanced electric field. The balanced electric field is configured to compensate for the excess of the plurality of charges in the environment to reduce and mitigate emission of electromagnetic radiation from the excess of the plurality of charges in the environment.

As such, the assembly described herein stabilizes the electric field and a magnetic field within the environment surrounding the head member such that the assembly described herein behaves as a passive system of prevention based on electrical activity in open and closed environments, which therefore reduces a magnetic field, such as to a desirable level. Various embodiments of the system and assembly that stabilizes the electric field in the environment that surrounds the assembly will be described in more detail herein. It should also be understood that in embodiments of the system described herein may also perform in a polarity of a negative earth system, in which certain regions of the earth the electrical field induced can generate a greater quantity of electrons.

Further, as used herein, the term "communicatively coupled" means that coupled components are capable of exchanging data signals and/or electric signals with one another such as, for example, electrical signals via conductive medium, electromagnetic signals via air, optical signals via optical waveguides electrical energy via conductive medium or a non-conductive medium, and the like.

Figure 1:
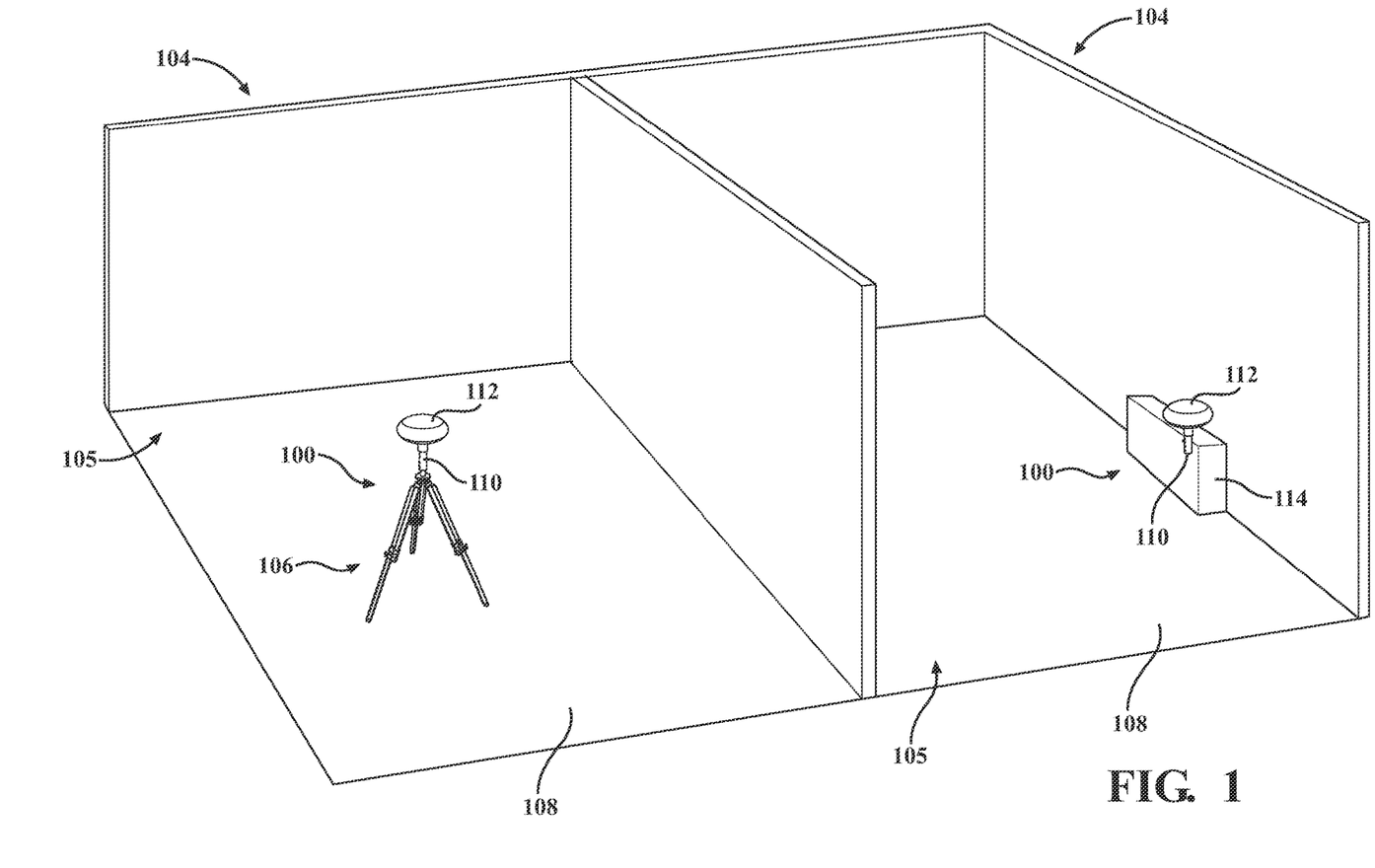
FIG. 1 schematically depicts an perspective environmental view of an electric field neutralizer assembly, according to one or more embodiments shown and described herein.

Referring now to the figures, FIG. 1 schematically depicts a perspective environmental view of a pair of electric field neutralizer assemblies 100 in an environment according to various embodiments. It should be understood that each of the pair of pair of electric field neutralizer assemblies 100 are identical except for a mounting position. As such, for brevity reasons, only one of the pair of electric field neutralizer assemblies 100 will be described herein. Further, it should be appreciated that any environment may include one or more electric field neutralizer assemblies 100. Further, yet, the environment may be a closed environment, as illustrated in FIG. 1 (i.e., a closed area that may be inside such as within two rooms of a building), an open environment (i.e., an open area that may be exterior of a surrounding such as in an airfield, a construction site, a power line grid, and the like), or a combination thereof.

Still referring to FIG. 1, the electric field neutralizer assembly 100 is positioned within a room 104 in a building 102 such that the electric field neutralizer assembly 100 is in an enclosed environment 105. Generally, this will be referred to as a closed environment. The electric field neutralizer assembly 100, in one embodiment, is coupled to a support member 106 that holds or positions the electric field neutralizer assembly 100 at a predetermined height H above a ground surface 108 in a vertical direction. In some embodiments, the support member 106 may be a tripod, a single support shaft member, and the like. That is, the support member 106 may be any device that positions the electric field neutralizer assembly 100 above a plane of the ground surface 108 in the vertical direction at the predetermined height H. In some embodiments, the predetermined height H is 70 centimeters. In other embodiments, the predetermined height is less than or greater than 70 centimeters. In embodiments, the support member 106 may be adjustable in height.

The support member 106 may be any tripod, single support shaft member, and the like, that is capable of coupling with an elongated member 110 of the electric field neutralizer assembly 100 to support the electric field neutralizer assembly 100 at the predetermined distance H above the ground surface 108 in the vertical direction, as described in greater detail herein. That is, the support member 106 may be any tripod, single support shaft member, and the like, that may be configured to receive a portion of the elongated member 110, and/or a portion of the support member 106 is configured to be received by the elongated member 110, as discussed in greater detail herein.

For instance, when the support member 106 is the tripod, at least a portion of the tripod receives a portion of the elongated member 110 to support the electric field neutralizer assembly 100 at the predetermined height H above the ground surface 108 in the vertical direction. As another example, when the support member 106 is the single support member, a portion of the single support member is received by the elongated member 110 to support the electric field neutralizer assembly 100 at the predetermined height H above the ground surface 108 in the vertical direction.

Further, the support member 106 may assist in grounding the electric field neutralizer assembly 100. For example, when the support member 106 is the tripod, at least one leg of the tripod is in communication with the ground surface 108. As such, the support member 106 places the electric field neutralizer assembly 100 in communication with the ground surface 108 so to communicatively couple the electric field neutralizer assembly 100 to the ground surface 108. The elongated member 110 of the electric field neutralizer assembly 100 supports a head member 112 of the electric field neutralizer assembly 100, as discussed in greater detail further below.

Still referring to FIG. 1, in other embodiments, the elongated member 110 of the electric field neutralizer assembly 100 is in communication with an object 114, such as a box, a crate, a ledge, and the like, to position the electric field neutralizer assembly 100 at the predetermined height H above the ground surface 108, as described in greater detail herein. For example, as shown in FIG. 1, the elongated member 110 is coupled to the object 114, which is in contact with the ground surface 108. The elongated member 110 supports the head member 112 in the vertical direction to position the electric field neutralizer assembly 100 at the predetermined height H.

The electric field neutralizer assembly 100 may be coupled to the object 114 using any suitable coupling devices, such as by fasteners that pass though the elongated member 110, as discussed in greater detail herein. In some embodiments, the object 114 has at least a portion in communication with the ground surface 108. As such, the object 114 places the electric field neutralizer assembly 100 in communication with the ground surface 108 so to communicatively couple the electric field neutralizer assembly 100 to the ground surface 108 via the object 114. In other embodiments, the object 114 may have a portion that is in contact with a secondary object that ultimately is in contact with the ground surface 108. That is, the object 114, such as a ledge, may not directly be in contact with the ground surface 108, but instead may be in contact with another object, such as a wall, beam, and the like, that is in contact with the ground surface 108.

Now referring to FIGS. 2-3, the electric field neutralizer assembly 100 will be described in greater detail. The head member 112 includes a floating electrode 202, a ground electrode 204, and an insulator portion 206. The floating electrode 202 is spaced apart from the ground electrode 204. In some embodiments, the insulator portion 206 is positioned between the floating electrode 202 and the ground electrode 204 to space the floating electrode 202 apart from the ground electrode 204. That is, the insulator portion 206 may be sandwiched and adjacently disposed between the floating electrode 202 and the ground electrode 204.

The floating electrode 202 is positioned above the ground electrode 204 in the vertical direction. As such, in the illustrated embodiment, the floating electrode 202 is positioned at the apex or peak of the electric field neutralizer assembly 100, taken from the ground surface 108 (FIG. 1) and/or the mounting portion of the object 114 (FIG. 1). That is, the floating electrode 202 is positioned the furthest from the ground surface 108. The floating electrode 202 is electrically isolated from the ground electrode 204 via the insulator portion 206.

The floating electrode 202 is configured to, through an electromagnetic induction, induce an electrical charge from the environment surrounding the head member 112. In some embodiments, the electrical charge from the environment surrounding the head member 112 is a charge with a polarity that is opposite from a positive earth system, such as a negative opposite polarity. That is, the charge may be of an opposite polarity of the ground. As such, an excess of electrons of the electrical charge of the negative opposite polarity in the floating electrode 202 flow to the ground electrode 204 to balance the existing charge on the ground electrode 204 using the electromagnetic induction, which collects charges from an excess of a plurality of charges in the environment for the electrical charge of the floating electrode 202. In other embodiments, the electrical charge from the environment surrounding the head member 112 is a polarity that is the same as the positive earth polarity.

The floating electrode 202 includes a floating electrode outer surface 220 and a floating electrode inner surface 221. In some embodiments, the floating electrode 202, the floating electrode inner surface 221 and the floating electrode outer surface 220 may form a crescent shape. In other embodiments, the floating electrode 202, the floating electrode inner surface 221 and the floating electrode outer surface 220 may form a semicircular shape, a half-moon shape, and/or the like. In other embodiments, the floating electrode 202, the floating electrode inner surface 221 and the floating electrode outer surface 220 may form any regular or irregular shape, such as a square, rectangular, octagon, hexagon, and/or the like.

Figure 2:
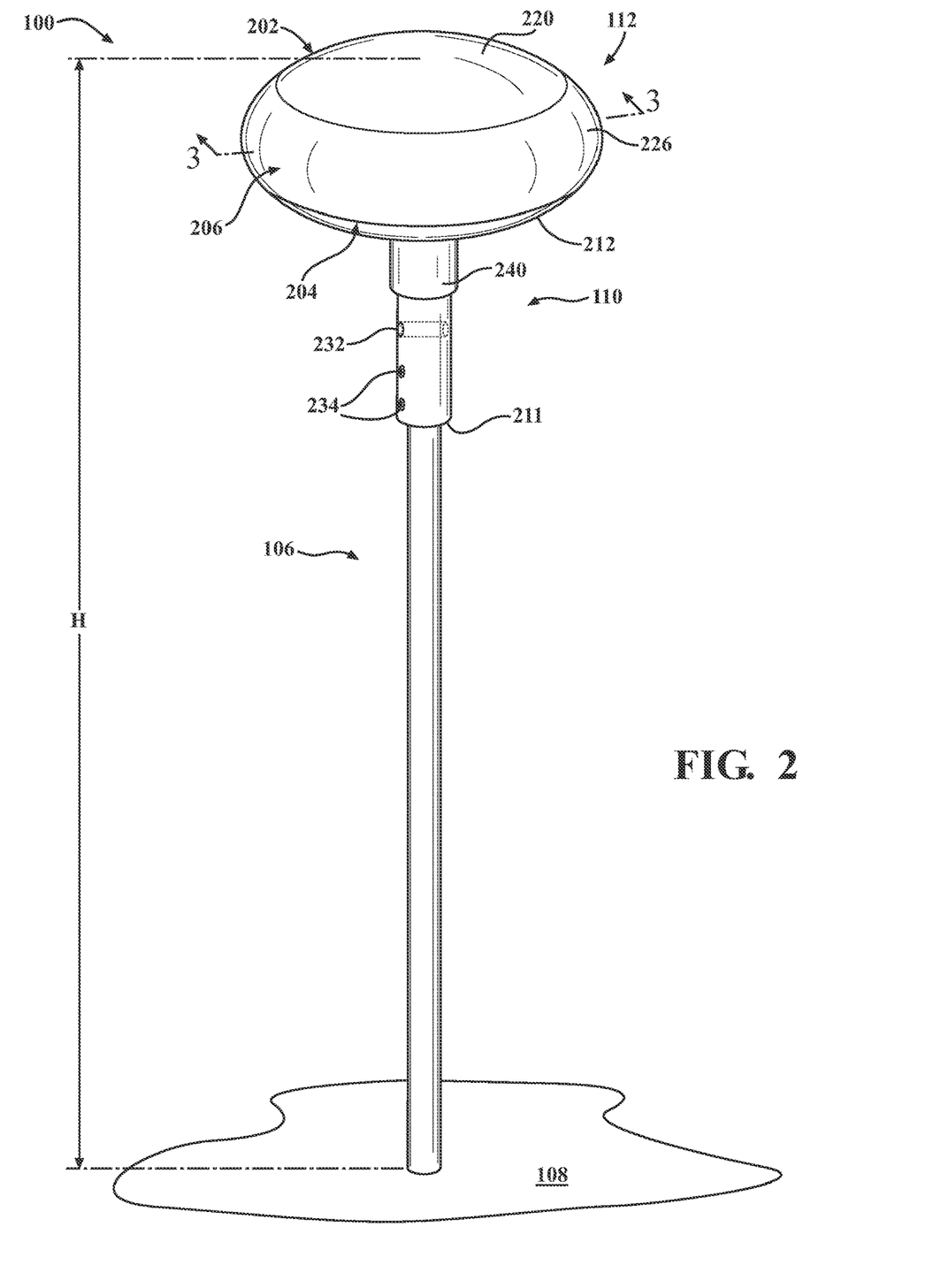
FIG. 2 schematically depicts an isolated view of the electric field neutralizer assembly of FIG. 1, according to one or more embodiments shown and described herein.
Figure 3:
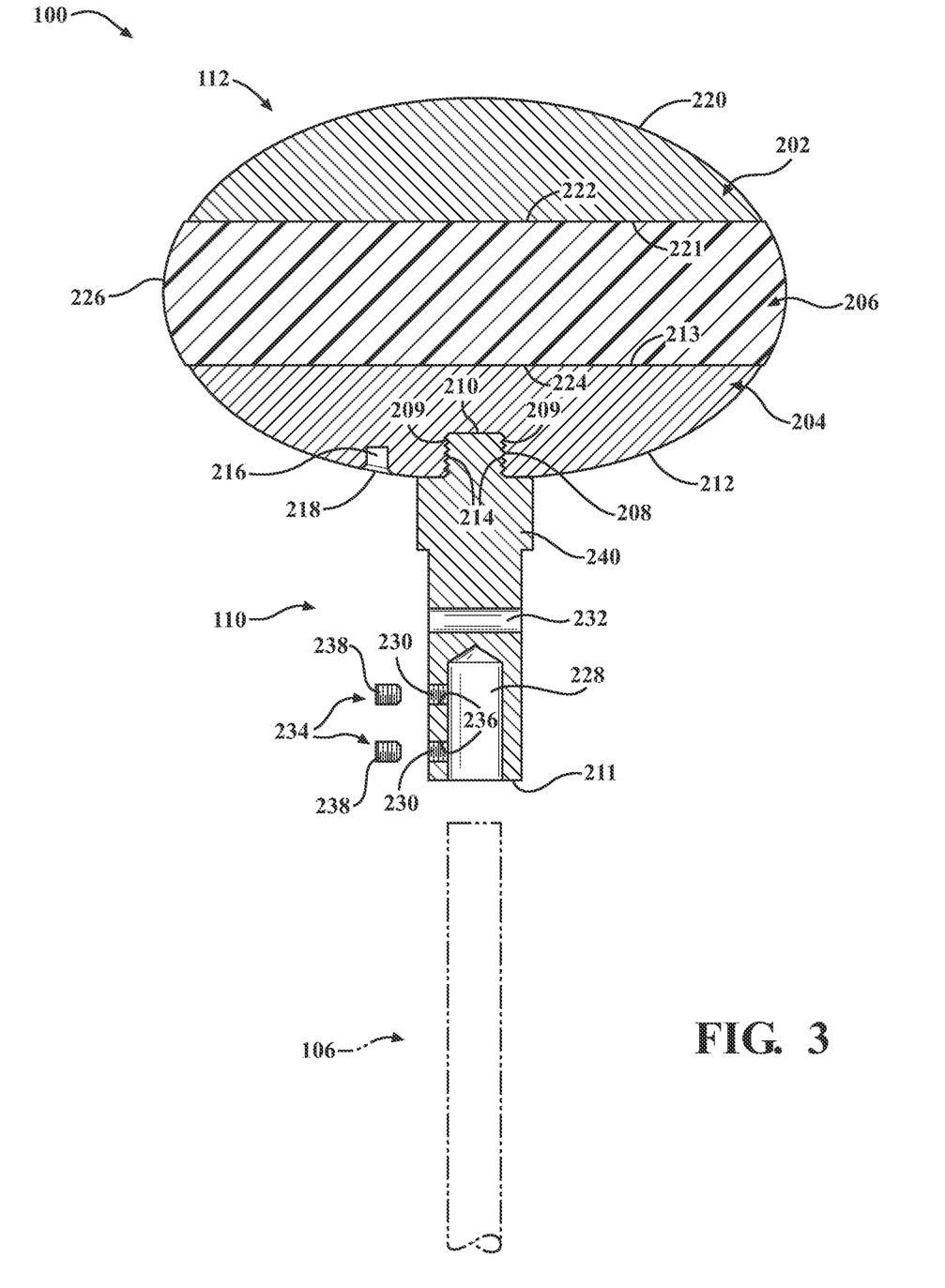
FIG. 3 schematically depicts a cross sectional view of the electric field neutralizer assembly of FIG. 2 taken from lines 3-3, according to one or more embodiments shown and described herein.

Still referring to FIGS. 2-3, the ground electrode 204 includes a ground electrode outer surface 212 and a ground electrode inner surface 213. In some embodiments, the ground electrode 204, the ground electrode inner surface 213 and the ground electrode outer surface 212 may form a crescent shape. In other embodiments, the ground electrode 204, the ground electrode inner surface 213 and the ground electrode outer surface 212 may form a semicircular shape, a half-moon shape, and/or the like. In other embodiments, the ground electrode 204, the ground electrode inner surface 213 and the ground electrode outer surface 212 may form any regular or irregular shape, such as a square, rectangular, octagon, hexagon, and/or the like.

In some embodiments, the floating electrode inner surface 221 and the floating electrode outer surface 220 of the floating electrode 202, and the ground electrode outer surface 212 and the ground electrode inner surface 213 of the ground electrode 204, are symmetrical with one another. That is, the floating and ground electrodes 202, 204 mirror one another in size and shape, with the exception of the details noted herein. In other embodiments, the floating electrode inner surface 221 and the floating electrode outer surface 220 of the floating electrode 202 may have a larger radius, diameter, and/or circumference when compared to the ground electrode outer surface 212 and the ground electrode inner surface 213 of the ground electrode 204. In other embodiments, the ground electrode outer surface 212 and the ground electrode inner surface 213 of the ground electrode 204 has a larger radius, diameter, and/or circumference when compared to the floating electrode inner surface 221 and the floating electrode outer surface 220 of the floating electrode 202.

Still referring to FIGS. 2-3, the ground electrode 204 includes a receiving portion 208 that may receive a distal end 210 of the elongated member 110, as discussed in greater detail herein. The receiving portion 208 may be a cavity, void, or channel that extends in the vertical direction from an inverse apex of the ground electrode outer surface 212. In some embodiments, the receiving portion 208 may include internal threads 209 that are complimentary to external threads 214 of the distal end 210 of the elongated member 110, as discussed in greater detail herein. In other embodiments, the receiving portion 208 may be configured for other connections such as a snap fit connection with the distal end 210 of the elongated member 110.

The ground electrode 204 further includes an inspection portion 216 that extends from the ground electrode outer surface 212 in the vertical direction. The inspection portion 216 may be a port with a plug 218 that is movable between an inspection position where access is available to the port and a covered position where access is inhibited from the port, as shown in FIG. 3.

The ground electrode 204 may be configured to receive, hold, maintain, and/or the like, a charge with the polarity of the positive earth system that may be transmitted to the ground electrode 204 by the elongated member 110 via the receiving portion 208. The ground electrode 204 may be configured to be connected to an electrical grounding. The ground electrode 204 may act as a ground for the electric field neutralizer assembly 100 by transmitting and/or receiving excess electrical charges via the receiving portion 208 and the elongated member 110. That is, when the ground electrode is charged with an existing charge of the polarity of the positive earth system, an excess of electrons of the electrical charge of the negative opposite polarity is transmitted or flow to the ground electrode to balance the existing charge on the ground electrode using the electromagnetic induction, which collects charges from an excess of a plurality of charges in the environment. In embodiments, when the ground electrode is charged with an existing charge of the polarity of a negative earth system, an excess of electrons of the electrical charge of the opposite positive polarity may balance the existing charge on the ground electrode using the electromagnetic induction.

Still referring to FIGS. 2-3, the floating electrode 202 and/or the ground electrode 204 may each be made from a non-ferromagnetic material. For example, in some embodiments, the floating electrode 202 and the ground electrode 204 may be made from a graphene material. In other embodiments, the floating electrode 202 and the ground electrode 204 may each be made from gold, silver, copper, aluminum, and the like.

In some embodiments, the floating electrode 202, the ground electrode 204 and/or the insulator portion 206 may each be layers and together may take on any shape. That is, while depicted as generally spherical, or spheroid, this is non-limiting and the floating electrode 202, the ground electrode 204 and/or the insulator portion 206 may be rectangular, square, hexagonal, octagonal, and/or the like. Further, the floating electrode 202, the ground electrode 204 and/or the insulator portion 206 may be any regular or irregular shape. Further, it should be appreciated that different shapes may be used in different applications.

For example, one shape may perform better to reduce or eliminate the direct and indirect effects produced by electrical and electromagnetic fields in the closed environments, while a different shape may perform better to reduce or eliminate the direct and indirect effects produced by electrical and electromagnetic fields in the open environments. Further, different shapes may have different coverage areas within the different environments. As such, it should be appreciated that the shape of the floating electrode 202, the ground electrode 204 and/or the insulator portion 206 of the head member 112 may be customized to achieve corresponding effects based on the shape in particular environments.

Still referring to FIGS. 2-3, the insulator portion 206 is positioned between the floating and ground electrodes 202, 204 to electrically isolate the floating electrode 202 and the ground electrode 204. In particular, the insulator portion 206 is positioned between the ground electrode inner surface 213 of the ground electrode 204 and the floating electrode inner surface 221 of the floating electrode 202. The insulator portion 206 includes an upper insulator surface 222, an opposite lower insulator surface 224, and an outer insulator surface 226. As such, the upper insulator surface 222 is in contact with the floating electrode inner surface 221 of the floating electrode 202 and the lower insulator surface 224 is in contact with the ground electrode inner surface 213 of the ground electrode 204.

In some embodiments, the insulator portion 206 may be a plurality of layers that are formed using conventional methods. In other embodiments, the insulator portion 206 may be a monolithic structure. Further, in some embodiments, the outer insulator surface 226 may generally be spherical or spheroid, to match or correspond to the shapes of the floating and ground electrodes 202, 204. In other embodiments, the insulator portion 206 may be regular or irregular shape and may take on a different shape than the shape of the floating and ground electrodes 202, 204.

For example, as best illustrated in FIGS. 2-3, the outer insulator surface 226 of the insulator portion 206 has a greater circumference that that of the ground electrode inner surface 213 of the ground electrode 204 and the floating electrode inner surface 221 of the floating electrode 202. That is, the outer insulator surface 226 of the insulator portion 206 extends outwardly from a center point a greater distance than either of the ground electrode inner surface 213 of the ground electrode 204 and the floating electrode inner surface 221 of the floating electrode 202. As such, the shape of the outer insulator surface 226 of the insulator portion 206 may alter or change the shape of the head member 112 of the electric field neutralizer assembly 100.

Still referring to FIGS. 2-3, in some embodiments, the elongated member 110 is generally a cylinder shape. In other embodiments, the elongated member 110 may be a plurality of other shapes, such as a cone, cube, triangular, and the like. The elongated member 110 includes the distal end 210 and an opposite proximate end 211. The receiving portion 208 receives the distal end 210. As such, in some embodiments, the distal end 210 of the elongated member 110 may include the external threads 214 that complement the internal threads 209 of the receiving portion 208. In other embodiments, the distal end 210 may be tapered for a snap fit configuration with the receiving portion 208. The proximate end 211 of the elongated member 110 includes a receiving channel 228. The receiving channel 228 receives a portion of the support member 106.

Further, a pair of fastener openings 230 and an aperture 232 are positioned perpendicular to the receiving channel 228. The pair of fastener openings 230 are in communication with the receiving channel 228. That is, the pair of fastener openings 230 extend into the receiving channel 228. In some embodiments, the pair of fastener openings 230 include internal threads 236. In other embodiments, the pair of fastener openings 230 are tapered. A pair of fasteners 234 may be inserted into the pair of fastener openings 230 to hold, maintain, and/or position the support member 106 within the receiving channel 228. That is, each one of the pair of fasteners 234, such as set screws, bolts, screws, rivets, cotter pins, and the like, are inserted into the pair of fastener openings 230 so to make contact with the portion of the support member 106 positioned within the receiving channel 228 of the elongated member 110. In some embodiments, each of the pair of fasteners 234 are externally threaded 238 to compliment the internal threads 236 of the pair of fastener openings 230.

The aperture 232 is positioned between the distal and proximate ends 210, 211 of the elongated member 110 so to not be in communication with the pair of fastener openings 230 and/or with the receiving channel 228. The aperture 232 receives a fastener, such as a nut and bolt, a screw, a rivet, a cotter pin, and the like, that passes through the elongated member 110 so to attach the elongated member 110 to the object 114 (FIG. 1), as discussed in greater detail herein.

In some embodiments, the elongated member 110 may be a monolithic structure. In other embodiments, the elongated member 110 may include a plurality of individual pieces that that joined, welded, or formed together. In some embodiments, the elongated member 110 includes a collar portion 240. In these embodiments, the collar portion 240 has a greater outer circumference and/or diameter than the other positons of the elongated member 110. That is, the collar portion 240 extends beyond the cylinder shape of the rest of the elongated member 110. It should be appreciated that the collar portion 240 may assist in attaching the distal end 210 of the elongated member 110 to the receiving portion 208 of the ground electrode 204, as discussed in greater detail herein. Further, the elongated member 110 may be made of a type of material that is conductive, such as copper, gold, silver, copper, aluminum, and the like.

Figure 4:
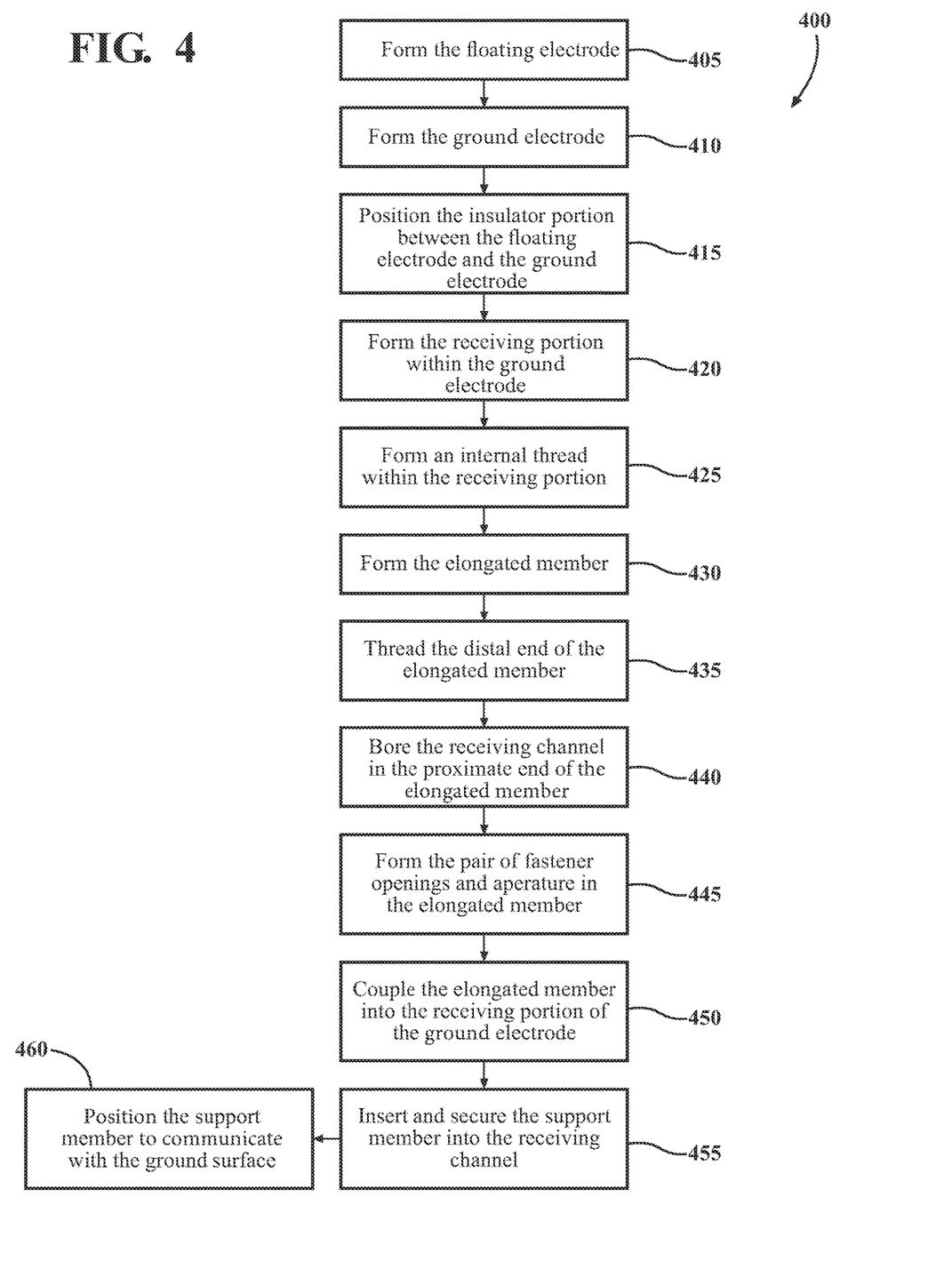
FIG. 4 depicts a flowchart of an illustrative method of forming the electric field neutralizer assembly according to one or more embodiments shown and described herein.

Still referring to FIGS. 3-4, in operation, when the ground electrode 204 is charged with the existing charge of the polarity of the positive earth system, the floating electrode 202, through an electromagnetic induction, induces an electrical charge from the environment surrounding the head member 112 of the negative opposite polarity. Excess of electrons of the electrical charge of the negative opposite polarity in the floating electrode 202 flow to the ground electrode 204 to balance the existing charge on the ground electrode 204 using the electromagnetic induction to collect charges from an excess of a plurality of charges in the environment for the electrical charge of the floating electrode 202 such that the floating and ground electrodes 202, 204 generate a balanced electric field. The balanced electric field is configured to compensate for the excess of the plurality of charges in the environment to reduce and mitigate emission of electromagnetic radiation from the excess of the plurality of charges in the environment.

That is, the floating electrode 202 collects charges in the environment surrounding the floating electrode 202 and the ground surface 108 communicatively couple to the ground electrode 204 to balance both the floating and ground electrodes 202, 204, thereby causing the internal electric field to be generated within the head member 112. The internal electric field derives or compensates the excess charges in the environment surrounding the head member 112 such that the floating and ground electrodes 202, 204 generate the balanced electric field. As a result, the electric field neutralizer assembly 100 reduces and/or eliminates electromagnetic pollution by reducing electric and magnetic fields to desirable levels. That is, the internal electric field is generated in the head member 112 to derive or compensate a plurality of charges in the environment where the head member 112 is positioned to reduce a plurality of undesirable effects caused from the plurality of charges in the environment surrounding the head member 112. As such, in some embodiments, the floating electrode 202 is an anode and the ground electrode 204 is a cathode. In other embodiments, the floating electrode 202 is the cathode and the ground electrode 204 is the anode.

It should be understood that the head member 112 of the electric field neutralizer assembly 100 is not limited to counteract specific frequencies, but instead is robust enough and is capable of taking on the shape and size so to be used as a countermeasure to the undesirable effects of the electric and electromagnetic fields in a plurality of different frequencies and energy intensities.

Now referring to FIG. 4 and still referring to FIGS. 2-3, an illustrative method 400 of forming the electric field neutralizer assembly 100 to stabilize the electric field in the environment of surrounding the head member 112 of the electric field neutralizer assembly 100 is provided. Although the steps associated with the blocks of FIG. 4 will be described as being separate tasks, in other embodiments, the blocks may be combined or omitted. Further, while the steps associated with the blocks of FIG. 4 will described as being performed in a particular order, in other embodiments, the steps may be performed in a different order.

The method includes, at block 405, the floating electrode 202 is formed. The floating electrode 202 may be formed from a non-ferromagnetic material and/or a combination of non-ferromagnetic materials. For example, the floating electrode 202 may be formed with a graphene material. Further, in some embodiments, the floating electrode 202 may be formed with an ohmic material. That is, an ohmic material may be a material where the current-voltage characteristic is linear, which can be expressed as V=IR, where V is the applied bias, I is the current due to the application of the bias, and R is the resistance which the material poses against the external voltage to not to let current (electron) flow through it. Further yet, the size and shape of the floating electrode 202 may be varied, or customized.

At block 410, the ground electrode 204 is formed. The ground electrode 204 may be formed from a non-ferromagnetic material and/or a combination of non-ferromagnetic materials. For example, the ground electrode 204 may be formed with a graphene material. Further, in some embodiments, the ground electrode 204 may be formed with an ohmic material. Further, the size and shape of the ground electrode 204 may be varied, or customized.

At block 415, the insulator portion 206 is positioned between the ground electrode 204 and the floating electrode 202. The insulator portion 206 may be positioned between and/or bonded to the ground electrode 204 and the floating electrode 202 using conventional methods. For instance, the insulator portion 206 may be adhered in position. Further, the insulator portion 206 may be welded, soldered, and the like. The size and shape of the insulator portion 206 may be varied, or customized.

At block 420, the receiving portion 208 is formed in the ground electrode 204. The receiving portion 208 may be formed by any suitable forming method, such as drilling, boring, and the like, to form an opening with a diameter large enough to accept the distal end 210 of the elongated member 110. In some embodiments, the internal threads 209 are formed, at block 425. The elongated member 110 is formed with the distal end 210 and the opposite proximate end 211, at block 430. The distal end 210 of the elongated member 110 is externally threaded, at block 435 and a receiving channel 228 is bored in the proximate end 211, at block 440. At block 445, the pair of fastener openings 230 and the aperture 232 are formed in the elongated member 110.

The elongated member 110 is coupled to the receiving portion 208, at block 450. In some embodiments, the coupling of the elongated member 110 to the receiving portion 208 is via the external threads 214 of the distal end 210 of the elongated member 110 and the internal threads 209 of the receiving portion 208. In other embodiments, the coupling of the elongated member 110 to the receiving portion 208 may be via a snap fit configuration. The support member 106 is inserted into the receiving channel 228 of the proximate end 211 of the elongated member 110 and is secured in position via the pair of fasteners 234 positioned within the pair of fastener openings 230, at block 455. The support member 106 is then positioned to be in communication with the ground surface 108 (FIG. 1), at block 460. It should be understood that, in other embodiments, at block 455, the elongated member 110 is coupled to the object 114 (FIG. 1) via the aperture 232 and a fastener, such as a bolt and nut, a screw, a rivet, and/or the like. In this embodiment, the object 114 is communicating with the ground surface 108, at block 460.

It should now be understood that the embodiments described herein provide for an assembly and a system that reduces and/or eliminates a full range of undesirable effects associated with electric and electromagnetic fields. As such, the assembly and a system described herein may be customized to adapt to the needs for each individual application in both open and closed environments.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An assembly to passively stabilize an electric field in an environment to reduce and mitigate emission of electromagnetic radiation from excess charges in the environment using a balanced electric field, the assembly comprising:
   an elongated member;
   a head member coupled to the elongated member, the head member comprising:
     a floating electrode;
     a ground electrode, the ground electrode spaced apart from the floating electrode and in communication with the elongated member and configured to be charged with a polarity of a earth system; and
     an insulator portion positioned between the floating electrode and the ground electrode and configured to electrically insulate the floating electrode from the ground electrode,
   wherein when the ground electrode is charged with an existing charge of the polarity of the earth system, the floating electrode through an electromagnetic induction induces an electrical charge of an opposite polarity from the environment surrounding the head member such that the electrical charge of the opposite polarity flows to balance the existing charge on the ground electrode using the electromagnetic induction and such that the floating and ground electrodes generate the balanced electric field.

2. The assembly of claim 1, wherein the floating electrode is an anode and the ground electrode is a cathode.

3. The assembly of claim 1, wherein the balanced electric field is generated in the head member to compensate for an excess of a plurality of charges in the environment where the head member is positioned.

4. The assembly of claim 3, wherein the balanced electric field generated in the head member reduces a plurality of undesirable effects based on the excess of the plurality of charges from the environment surrounding the head member.

5. The assembly of claim 1, wherein the head member is configured to stabilize and reduce the electric field and a magnetic field of the environment surrounding the head member based on the electromagnetic induction.

6. The assembly of claim 1, wherein the floating electrode or the ground electrode is made of a non-ferromagnetic material.

7. The assembly of claim 6, wherein the floating electrode or the ground electrode is made of a graphene material.

8. The assembly of claim 1, wherein the environment is a closed area.

9. The assembly of claim 1, wherein the environment is an open area.

10. The assembly of claim 1, wherein the head member is positioned at least 70 centimeters above a ground surface.

11. The assembly of claim 1, wherein the ground electrode acts as a ground when coupled to a ground surface of the earth system.

12. An assembly to reduce a plurality of excess charges from an environment surrounding the assembly to stabilize an electric field in the environment to reduce and mitigate emission of electromagnetic radiation in the environment using a balanced electric field, the assembly comprising:
   an elongated member in communication with a ground surface;
   a head member coupled to the elongated member, the head member comprising:
     a floating electrode;
     a ground electrode, the ground electrode is spaced apart from the floating electrode and in communication with the elongated member and configured to be a ground of the head member; and
     an insulator portion positioned between the floating and ground electrodes and configured to electrically insulate the floating electrode from the ground electrode,
   wherein when the ground electrode is charged with an existing charge of the ground surface, the floating electrode through an electromagnetic induction induces an electrical charge from the environment surrounding the head member of an opposite polarity, such that the electrical charge of the opposite polarity flows to balance the existing charge on the ground electrode using the electromagnetic induction and such that the floating and ground electrodes generate the balanced electric field.

13. The assembly of claim 12, wherein the balanced electric field is generated in the head member to compensate for the plurality of excess charges in the environment where the head member is positioned.

14. The assembly of claim 12, wherein the head member reduces the electric field and a magnetic field of the environment surrounding the head member.

15. The assembly of claim 12, wherein the floating electrode and the ground electrode is made of a non-ferromagnetic material.

16. The assembly of claim 15, wherein the floating electrode or the ground electrode is made of a graphene material.

17. The assembly of claim 12, wherein the environment is a closed area.

18. The assembly of claim 12, wherein the environment is an open area.

19. The assembly of claim 12, wherein the head member is positioned at least 70 centimeters above the ground surface.

20. A method of forming an assembly to stabilize an electric field in an environment to reduce and mitigate emission of electromagnetic radiation from excess charges in the environment using a balanced electric field, the method comprising:
    forming a floating electrode;
    forming a ground electrode configured to be charged with a polarity of a earth system;
    positioning an insulator portion between the floating electrode and the ground electrode to form a head member such that the ground electrode is spaced apart from the floating electrode, the insulator portion is configured to electrically insulate the floating electrode from the ground electrode;
    forming a receiving portion into a ground electrode outer surface of the ground electrode;
    forming an elongated member having a distal end and a proximate end;
    inserting the distal end of the elongated member into the receiving portion of the ground electrode such that the ground electrode is in communication with the elongated member;
    coupling the elongated member to the receiving portion of the ground electrode;
    communicating the proximate end of the elongated with a ground surface;
    charging the ground electrode with an existing charge of the polarity of the earth system;
    inducing via the floating electrode and through an electromagnetic induction an electrical charge of an opposite polarity from the environment surrounding the head member;
    balancing via a flow of the electrical charge of the opposite polarity the existing charge on the ground electrode using the electromagnetic induction; and
    generating via the flow and the floating and ground electrodes the balanced electric field.

* * * * *